United States Patent
Akaha (10) Patent No.: US 7,422,412 B2
(45) Date of Patent: Sep. 9, 2008

(54) HORIZONTAL ARTICULATED ROBOT

(75) Inventor: Kazushige Akaha, Hokuto (JP)

(73) Assignee: Seiko Epson Corporation (JP)

( * ) Notice: Subject to any disclaimer, the term of this patent is extended or adjusted under 35 U.S.C. 154(b) by 75 days.

(21) Appl. No.: 11/304,935

(22) Filed: Dec. 15, 2005

(65) Prior Publication Data

US 2006/0133918 A1 Jun. 22, 2006

(30) Foreign Application Priority Data

Dec. 16, 2004 (JP) ............... 2004-363919

(51) Int. Cl.
*B25J 17/02* (2006.01)
(52) U.S. Cl. .............. 414/744.5; 74/490.02; 74/490.06; 414/918; 901/29
(58) Field of Classification Search .............. 414/744.5, 414/744.1, 918; 901/15, 28, 29; 74/490.05, 74/490.06, 490.01, 490.02
See application file for complete search history.

(56) References Cited

U.S. PATENT DOCUMENTS

| 4,568,238 A | | 2/1986 | Hirano et al. | |
| 4,767,257 A | * | 8/1988 | Kato | ......................... 414/744.5 |
| 4,955,250 A | * | 9/1990 | Fisher | ...................... 74/490.05 |
| 5,205,701 A | | 4/1993 | Kigami et al. | |
| 6,199,444 B1 | | 3/2001 | Wakaizumi et al. | |
| 6,593,718 B1 | | 7/2003 | Yamazoe | |
| 6,893,204 B1 | * | 5/2005 | Suzuki et al. | ............ 414/744.5 |
| 7,104,153 B2 | * | 9/2006 | Matsumoto et al. | ...... 74/490.02 |
| 2002/0148320 A1 | | 10/2002 | Kimata et al. | |

FOREIGN PATENT DOCUMENTS

| JP | 60-213488 | 10/1985 |
| JP | 61-121888 | 6/1986 |
| JP | 62-48485 | 3/1987 |
| JP | 62-165890 | 10/1987 |
| JP | 04-269193 | 9/1992 |
| JP | 09-285982 | 11/1997 |
| JP | 11-301813 | 11/1999 |
| JP | 2000-024966 | 1/2000 |
| JP | 2001-038656 | 2/2001 |
| JP | 2002-321185 | 11/2002 |
| KR | 1991-19735 A | 12/1991 |

OTHER PUBLICATIONS

Communication from European Patent Office regarding counterpart application.
Office Action from Korean Patent Office regarding corresponding Korean Patent Application No. 10-2005-0115807.

* cited by examiner

*Primary Examiner*—Donald Underwood
(74) *Attorney, Agent, or Firm*—Harness, Dickey & Pierce, P.L.C.

(57) ABSTRACT

A horizontal articulated robot has a plurality of horizontal arms coupled by joint shafts, and a working shaft disposed at the extreme end of an extreme end arm among the horizontal arms has mounting portions of an end effector formed to both the upper and lower ends thereof. With this arrangement, there can be provided a horizontal articulated robot that can cope with various work transport forms and various types of works by one type of a robot by selectively using the upper and lower sides of a working shaft.

12 Claims, 7 Drawing Sheets

HORIZONTAL ARTICULATED ROBOT

The entire disclosure of Japanese Patent Application No. 2004-363919, filed Dec. 16, 2004, is expressly incorporated by reference herein.

BACKGROUND OF THE INVENTION

1. Field of the Invention

The present invention relates to an horizontal articulated robot, and more particularly, to a structure of mounting portions of an end effector mounted at the extreme end of a robot arm.

2. Description of the Related Art

Horizontal articulated robots, which are also called scalar robots, are excellent particularly in compactness and workability and often used in industrial robots. The horizontal articulated robot has such a structure that ordinarily, first and second arms turn each in a respective horizontal plane through first and second joint shafts, respectively and an end effector such as a hand and the like is mounted on a working shaft attached to the extreme end of the second arm to thereby cause the end effector to execute a desired job such as an assembly, transport, and the like of a work (refer to, for example, Japanese Unexamined Patent Application Publications Nos. 2000-24966 and 11-301813). In this case, in the robot shown in the patent document 1, the upper surface of a second arm acts as a mounting portion for transporting a work, and, in the robot shown in the patent document 2, the lower surface of a second arm acts as a mounting portion for assembling and transporting a work.

As described above, in the conventional horizontal articulated robots, the mounting portion of a hand or a work is disposed only to one side (upper or lower side) of the second arm, that is, an extreme end arm. When, for example, a job for transferring a wafer, a glass substrate, and the like is executed, an end effector such as a hand and the like must be mounted on the upper side of the extreme end arm. On the other hand, when assembly, transport, and the like of parts are executed, the end effector must be mounted on the lower side of the extreme end arm. Accordingly, a type of a robot and a mounting method must be changed in conformity with a work transport form, a type of a work, and the like. As a result, in a conventional robot system, there is a possibility that different types of robots are mixedly used depending on types of work transport forms and types of works.

Further, in a robot having such a structure that wiring or piping ducts of a drive unit for driving an end effector, a working shaft, and the like are exposed in the periphery of arms, the robot is bad in an outside appearance as well as the layout of the wiring or piping ducts must be determined such that the motion of the arms is not restricted by the ducts and that the ducts do not interfere with an external object and the like.

An object of the present invention, which was made in view of the above problems, is to provide a horizontal articulated robot that can cope with various work transport forms and various types of works by one type of a robot by selectively using the upper and lower ends of a working shaft.

Further, an object of the present invention is to provide a horizontal articulated robot that minimizes the externally exposed portions of wiring or piping of a drive unit of an end effector, a working shaft, and the like as well as does not restrict the motion of arms and does not have a possibility of interfering with an external object and the like.

SUMMARY

A horizontal articulated robot according to the present invention is characterized by comprising a plurality of horizontal arms coupled by joint shafts, wherein a working shaft disposed at the extreme end of an extreme end arm among the horizontal arms has mounting portions of an end effector formed to both the upper and lower ends thereof.

In the horizontal articulated robot of the present invention, the mounting portions of the end effector are disposed to both the upper and lower ends of the working shaft disposed at the extreme end of the extreme end arm. Thus, when the end effector is mounted on the upper side of the extreme end arm, the robot can be applied to a job for transferring a work such as a wafer, a glass substrate, and the like, whereas when the end effector is mounted on the lower side of the extreme end arm, the robot can be applied to an ordinary job for assembly, transport, and the like of parts. Accordingly, various work transport forms and various types of works can be coped with by disposing only one type of the robot, thereby a compact and economical robot system can be constructed.

Further, the working shaft is preferably composed of a hollow rotary shaft. With this arrangement, since wiring or piping of the end effector can be caused to pass through the inside of the hollow rotary shaft, the wiring/piping is not almost exposed to the outside and can be made neat and tidy.

The hollow rotary shaft may have a mounting flange disposed to at least one end. Although mounting flanges may be disposed to both the upper and lower ends of the hollow rotary shaft, when the mounting flange is disposed to at least the upper end, the robot can be applied to transport of a flat work.

Further, according to the present invention, the wiring for the end effector may be caused to pass through the inside of the hollow rotary shaft.

When the end effector requires electric wiring, an outside appearance can be made neat and tidy as described above by causing the electric wiring to pass through the inside of the hollow rotary shaft. Further, the wiring does not act as an obstacle to a motion of the arm and does not have a possibility that it interferes with an external object and the like.

Further, according to the present invention, piping for the end effector is caused to pass through the inside of the hollow rotary shaft or airtightly connected to a mounting portion opposite to the mounting portion of the end effector.

When the end effector makes use of fluid pressure, fluid supply piping is caused to pass through the inside of the hollow rotary shaft likewise the case of the electric wiring or airtightly connected to the mounting portion opposite to the mounting portion of the end effector. With this arrangement, an advantage similar to that of the electric wiring can be obtained.

Further, according to the present invention, the mounting portion of the end effector may be composed of a flange coupling means or an instant mounting/dismounting type coupling means. More specifically, the mounting portion of the end effector is composed of a flange joint composed of a plurality of screws or bolts or is of an instant mounting/dismounting type that employs screw coupling and the like. The former is advantageous in that a height can be reduced, and the latter is advantageous in that mounting and dismounting can be executed simply in a short time.

Further, according to the present invention, a drive means of the working shaft may be disposed in the inside of the extreme end arm.

Accordingly, since the drive means of the working shaft does not project externally of the extreme end arm, there is not a possibility at all that the drive means interferes with the external object and the like and the outside appearance of the shape of the arm can be made neat and tidy.

Further, according to the present invention, the plurality of horizontal arms, the plurality of joint shafts, and the arm drive means may be formed in a hollow arrangement.

With this arrangement, the wiring of the drive means of the working shaft and the arm drive means and the piping of the end effector can be disposed passing through the inside of the arms. Accordingly an outside appearance can be improved, the motion of the arms is not restricted by the wiring and the piping, and there is not a possibility at all that they interfere with the external object and the like.

Further, according to the present invention, an arm base, which is coupled with an up/down movement mechanism, to support the horizontal arms may be formed in a hollow arrangement.

Since the arm base is further formed in the hollow arrangement, the wiring and the piping can be disposed passing through the inside of the arm base.

Further, according to the present invention, the wiring and/or the piping of the end effector is caused to pass through the inside of the extreme end arm.

With this arrangement, the wiring and the piping of the end effector can be accommodated in the inside of the arm without being almost exposed to the outside.

DESCRIPTION OF THE PREFERRED EMBODIMENTS

Embodiments to which the present invention is applied will be explained below with reference to drawings.

Embodiment 1

Figure 1:
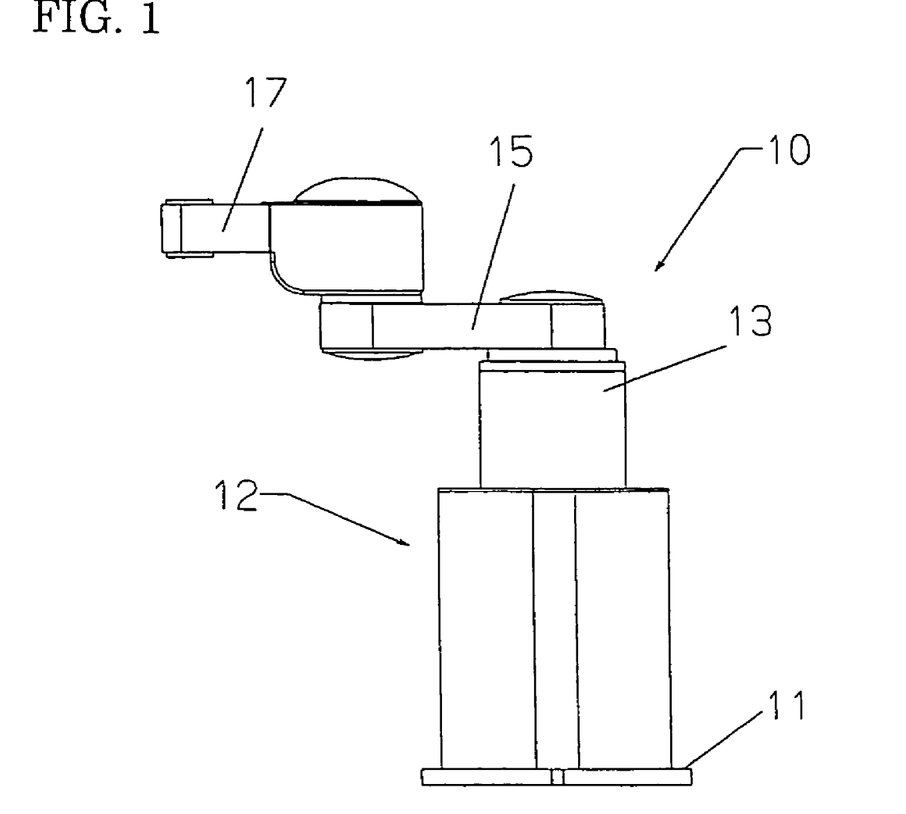
FIG. 1 is a side elevational view of a horizontal articulated robot of an embodiment 1 of the present invention.
Figure 2:
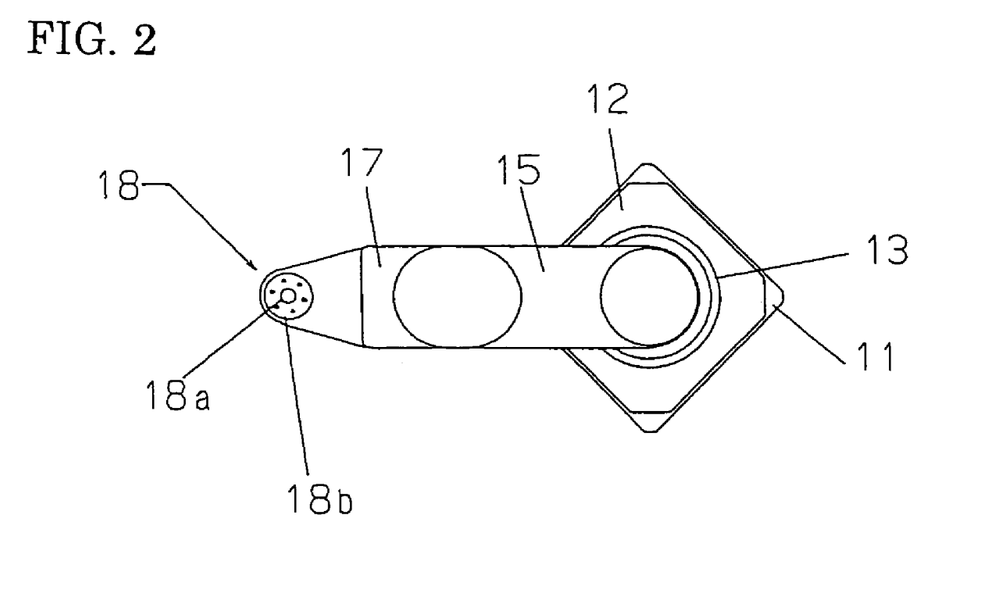
FIG. 2 is an upper surface view of the horizontal articulated robot.
Figure 3:
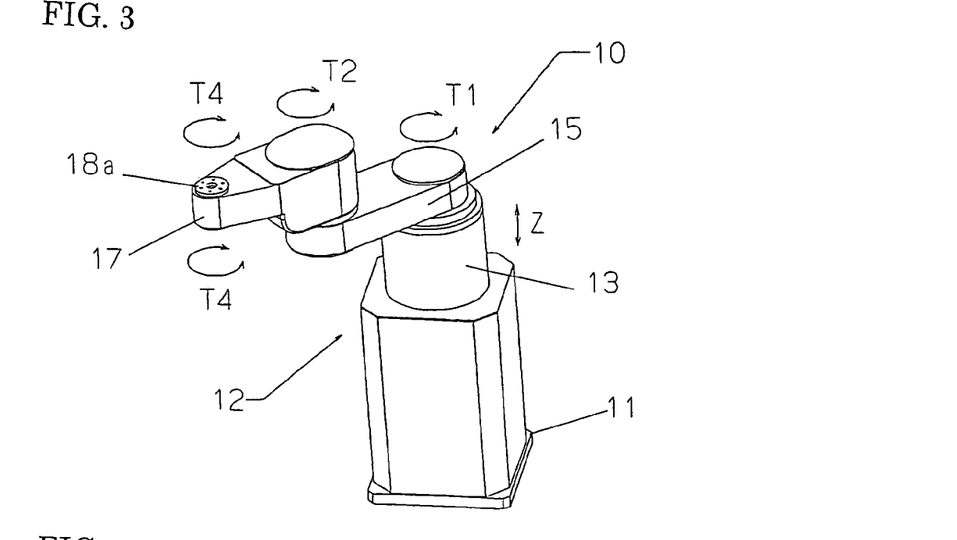
FIG. 3 is a perspective view of the horizontal articulated robot.
Figure 4:
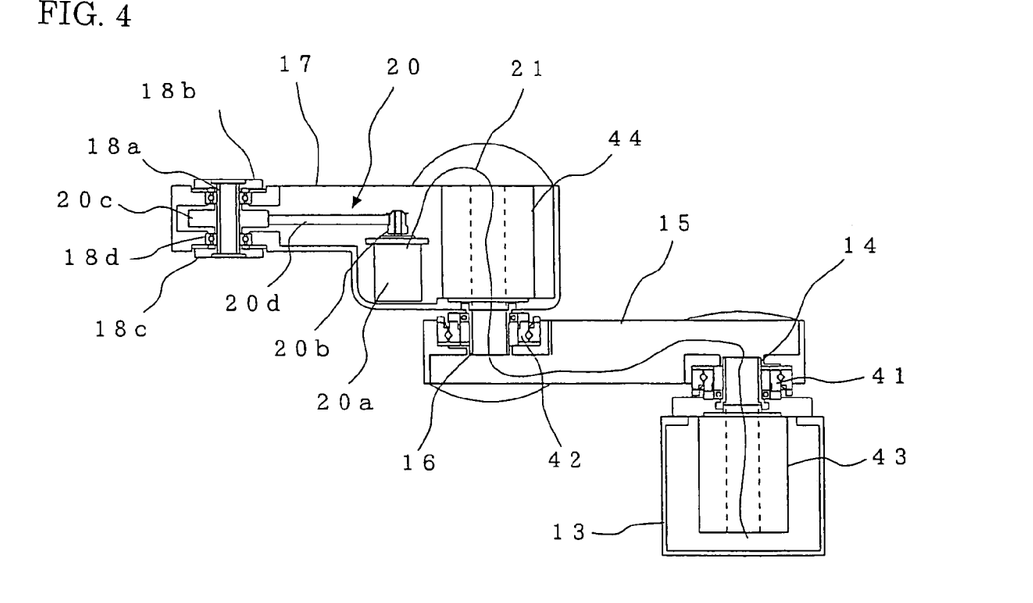
FIG. 4 is a sectional view of an arm portion of the horizontal articulated robot.

FIG. 1 is a side elevational view of a horizontal articulated robot of an embodiment 1 according to the present invention, FIG. 2 is an upper surface view of the horizontal articulated robot, and FIG. 3 is a perspective view of the horizontal articulated robot. Further, FIG. 4 is a sectional view showing an arm portion of the horizontal articulated robot.

The horizontal articulated robot 10 includes a base 11, an arm base 13 coupled with the base 11 through an up/down movement mechanism 12, a first arm 15 coupled with the arm base 13 through a first joint shaft 14, a second arm 17 coupled with the first arm 15 through a second joint shaft 16, and a working shaft 18 rotatably disposed to the extreme end of the second arm 17.

The first and second arms 15 and 17 are horizontal arms that turn in a horizontal surface, and the second arm 17 constitutes an extreme end arm. Further, the number of the arms is not particularly limited and ordinarily set between 2 and 4.

The up/down movement mechanism 12 is composed of a directly driven shaft driven by a ball screw, a rack and a pinion, a belt, and the like. Note that the up/down movement mechanism 12 is not limited to the directly driven type and may be composed of a link structure composed of parallel links.

Although the working shaft 18 may be a solid shaft, it is preferably a hollow rotary shaft 18a as shown in FIG. 4. An upper hollow mounting flange 18b and a lower hollow mounting flange 18c, which act as mounting portions, are disposed to the upper and lower ends of the hollow rotary shaft 18a, and an appropriate end effector is mounted on the respective hollow mounting flanges 18b and 18c according to an object and contents of a job as described later.

The upper and lower portions of the hollow rotary shaft 18a are rotatably supported by the extreme end of the second arm (extreme end arm) 17 through bearings 18d, respectively, and a belt drive mechanism 20 as an example is coupled with the intermediate portion of the hollow rotary shaft 18a. The belt drive mechanism 20 is arranged such that a driver pulley 20b of a drive motor 20a with a reducer is coupled with a follower pulley 20c of the hollow rotary shaft 18a through a timing belt 20d. Accordingly, the hollow rotary shaft 18a can be rotated 360° in the direction of an arrow T4 of FIG. 3.

Further, the first joint shaft 14 of the first arm 15 and the second joint shaft 16 of the second arm 17 are driven in rotation, respectively by first and second motors 43 and 44 through first and second reducers 41 and 42 each composed of a harmonic drive gear mechanism. More specifically, the first arm 15 can be rotated 360° about the first joint shaft 14 in the direction of an arrow T1 of FIG. 3, and the second arm 17 can be rotated 360° about the second joint shaft 16 in the direction of an arrow T2. Further, all of the first and second arms 15 and 17, the first and second joint shafts 14 and 16, the first and second reducers 41 and 42, the first and second motors 43 and 44, and the arm base 13 are arranged as a hollow structure as shown in FIG. 4. Therefore, wiring 21 of the drive motor 20a with the reducer for the hollow rotary shaft 18a can be guided from the inside of the second arm 17 into the first arm 15 through the insides of the second motor 44, the second reducer 42, and the second joint shaft 16 and further into the arm base 13 through the insides of the first joint shaft 14, the first reducer 41, and the first motor 43. The wiring 21 may be guided inversely. Further, although illustration is omitted, wiring of the second motor 44 can be also guided into the arm base 13 through the inside of the first arm 15 after it is passed through the inside of the second motor 44 likewise the wiring 21. As a result, since the wiring 21 and piping (to be described later) for the end effector mounted on the extreme end arm and the hollow rotary shaft drive motor 20a can be accommodated in the arms, the outside appearance of the horizontal articulated robot can be made neat and tidy as well as there is not a possibility at all that the robot interferes with an external object as in a case in which wiring and piping ducts are exposed to the outside. Further, the motions of the first and second arms 15 and 17 are not restricted by the wiring and the piping, and the arms have a motion range of 360°, respectively.

Further, since the hollow rotary shaft drive motor 20*a* is disposed in the inside of the second arm 17, the second arm 17 has no projecting portion due to the motor 20*a*. Thus, there is not a possibility that the hollow rotary shaft drive motor 20*a* interferes with an external object and the like, and the outside appearance of the second arm 17 can be made neat and tidy.

Figure 5A:
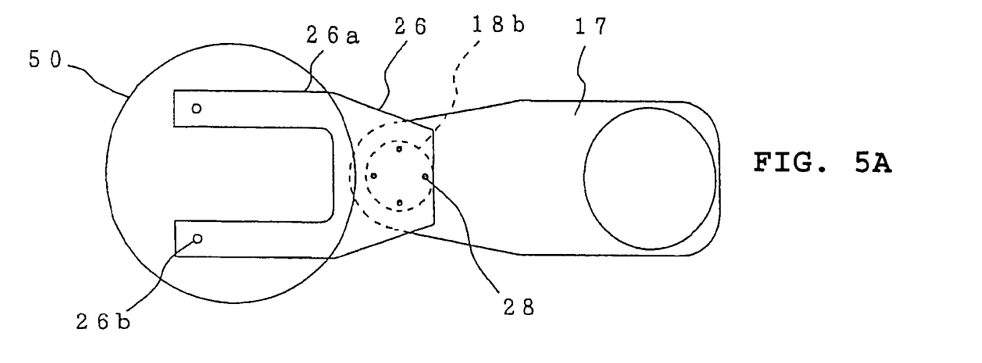
FIGS. 5A-5C are views showing a mounting example of an end effector mounted on the upper side of a second arm, wherein 5A is an upper surface view, 5B is a side elevational view, and 5O is a sectional view.

Next, FIGS. 5A to 7 show mounting examples of the end effector of the horizontal articulated robot 1O. FIGS. 5A-5C show an example in which the end effector is mounted on the upper side of the second arm 17, wherein 5A shows an upper surface view, 5B shows a side elevational view, and 5C shows a sectional view.

Figure 5B:
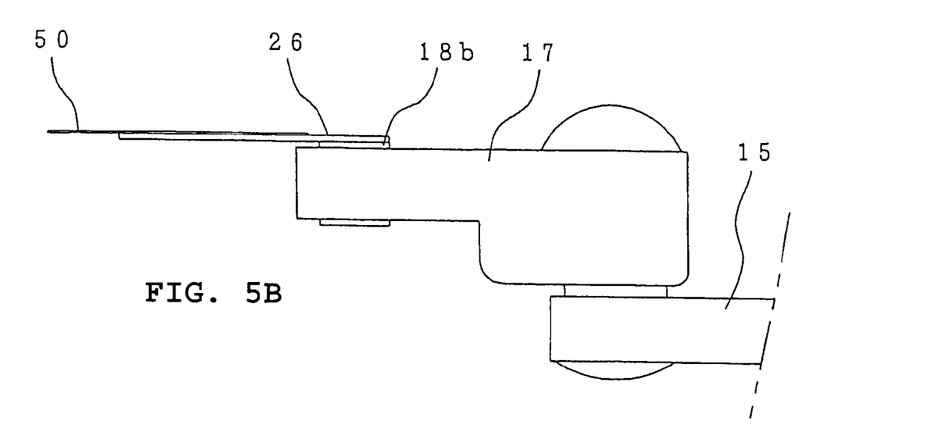
Figure 5C:
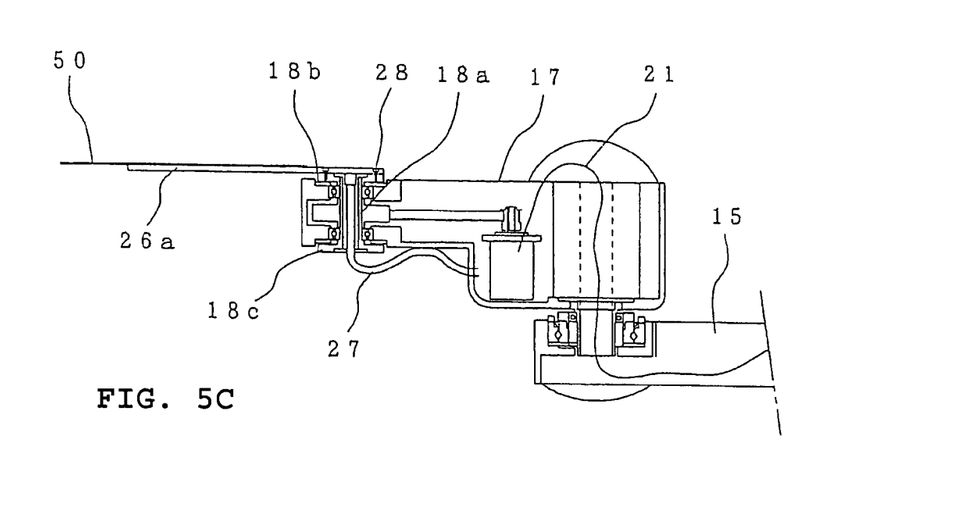

FIGS. 5A-5C show an attraction hand 26 as an example of the end effector. The attraction hand 26 has a support arm 26*a* formed in a C-shape when observed from an upper side, and the support arm 26*a* has suction holes 26*b* formed thereto. The attraction hand 26 is formed in a flat shape in its entirety and mounted on the upper hollow mounting flange 18*b* of the hollow rotary shaft 18*a* by screws (or bolts) 28. Further, a suction tube 27 that communicates with the suction holes 26*b* is connected to the attraction hand 26 from the lower side of the second arm 17 through the insides of the lower hollow mounting flange 18*c* and the hollow rotary shaft 18*a*. The base end side of the suction tube 27 is connected to a suction pump, a cylinder (not shown) or the like through the inside of the second arm 17.

When the attraction hand 26 arranged as described above is mounted on the upper hollow mounting flange 18*b* of the hollow rotary shaft 18*a* disposed at the extreme end of the second arm 17, a thin and flat work 50 such as a wafer, a glass substrate, and the like can be sucked by and held on the attraction hand 26 and transferred to a target position by the turning motions of the first and second arms 15 and 17 and by the turning motion of the hollow rotary shaft 18*a*. More specifically, when the end effector is mounted on the upper side of the second arm 17, the horizontal articulated robot 10 can be applied to a transfer job of the wafer, the glass substrate, and the like.

Figure 6A:
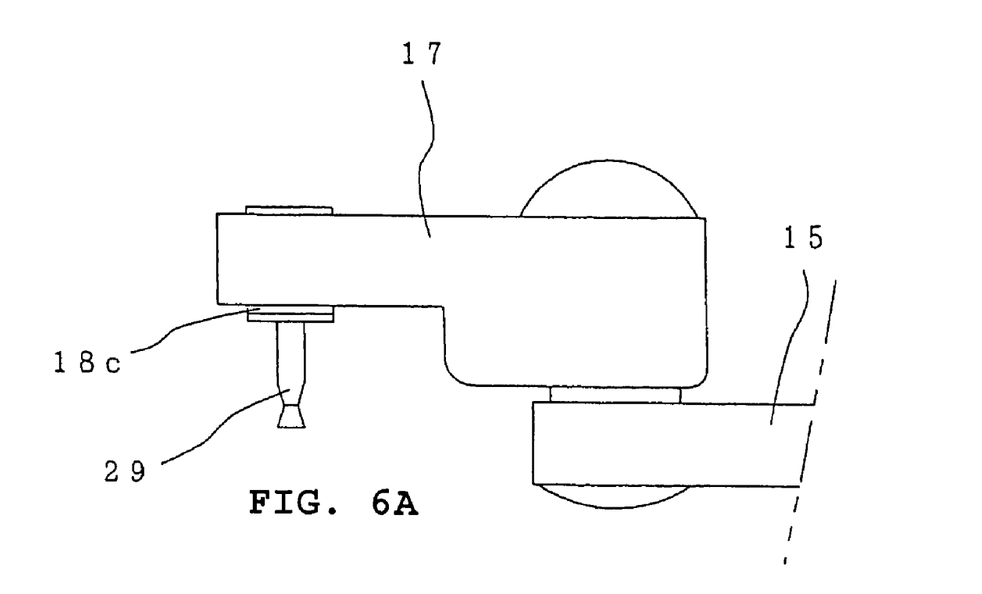
FIGS. 6A-6B are views showing a mounting example of the end effector mounted on the lower side of the second arm, wherein 6A is a side elevational view, and 6B is a sectional view.
Figure 6B:
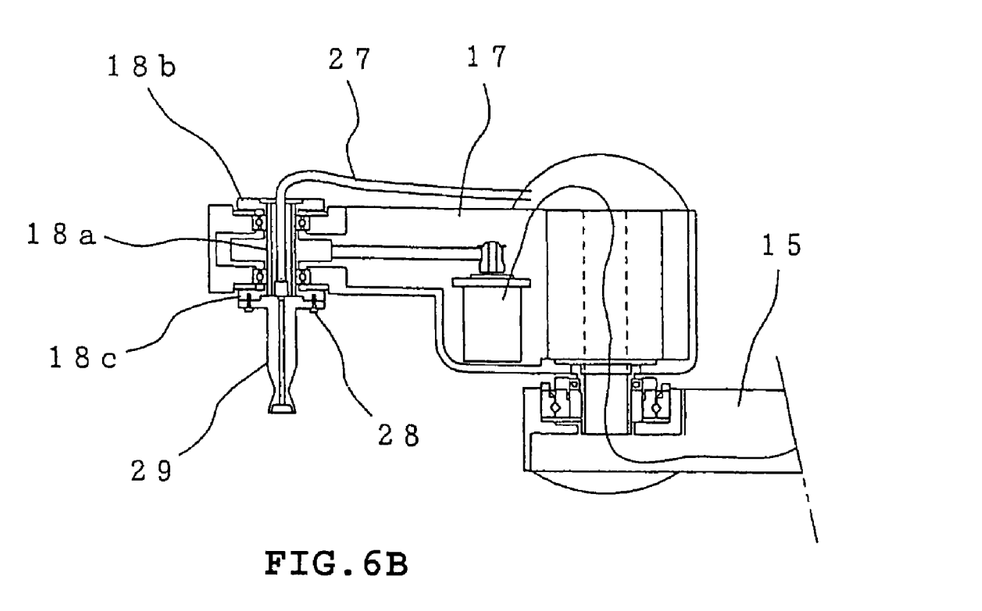

FIGS. 6A-6B show a mounting example of the end effector mounted on the lower side of the second arm 17, wherein 6A shows a side elevational view and 6B shows a sectional view. In FIGS. 6A-6B, a pipe-like attraction hand 29 is mounted on the lower hollow mounting flange 18*c* of the hollow rotary shaft 18*a* in a downward direction as an example of the end effector. Then, an end of the suction tube 27 is connected from the upper side of the second arm 17 to the attraction hand 29 through the insides of the upper hollow mounting flange 18*b* and the hollow rotary shaft 18*a*, whereas the base end side of the suction tube 27 enters the inside of the second arm 17 from the upper side thereof and connected to the suction pump, the cylinder (not shown), or the like.

Accordingly, when the pipe-like attraction hand 29 arranged as described above is mounted on the lower hollow mounting flange 18*c* of the hollow rotary shaft 18*a* disposed to the extreme end of the second arm 17, works (not shown) such as small parts and the like can be assembled or transported. More specifically, when the end effector is mounted on the lower side of the second arm 17, the horizontal articulated robot 10 can be applied to an ordinary job such as an assembly job and the like.

According to the embodiment, the hollow mounting flanges 18*b* and 18*c* for the end effector are disposed to both the upper and lower ends of the hollow rotary shaft 18*a* as the working shaft disposed at the extreme end of the second arm 17. Therefore, when the end effector is mounted on the upper side of the second arm 17, the transfer job of the flat-shaped work such as the wafer, the glass substrate, and the like can be executed, whereas when the end effector is mounted on the lower side of the second arm 17, the ordinary job such as the assembly, the transportation and the like of the parts can be executed. Accordingly, jobs can be executed with only one type of the horizontal articulated robot 10 by selectively using the upper and lower ends of the hollow rotary shaft 18*a* acting as the mounting portions of the end effector, in correspondence to various work transport forms and various types of works, thereby a very economical and compact robot system can be constructed.

Note that the suction tube 27 may be airtightly connected to the lower hollow mounting flange 18*c* in the case of FIGS. 5A-5C and the like can be is mounted on the the ordinary job such as the the like of the parts can be be executed with only one type 10 by selectively using and to the upper hollow mounting flange 18*b* in the case of FIGS. 6A-6B by flange coupling without passing though the inside of the hollow rotary shaft 18*a* as described above. Further, when the end effector is driven electrically, the wiring thereof is connected passing through the inside of the hollow rotary shaft 18*a*.

Further, in the mounting examples described above, a portion of the suction tube 27 is exposed to the lower or upper side of the second arm 17. However, since the suction tube 27 is partly exposed and furthermore can be fixed along the second arm 17 by an appropriate fixture (not shown), there is not a possibility at all that the exposed portion of the piping of the second arm 17 and the like acts as an obstacle to the motion of the robot and interferes with the external object and the like.

Figure 7:
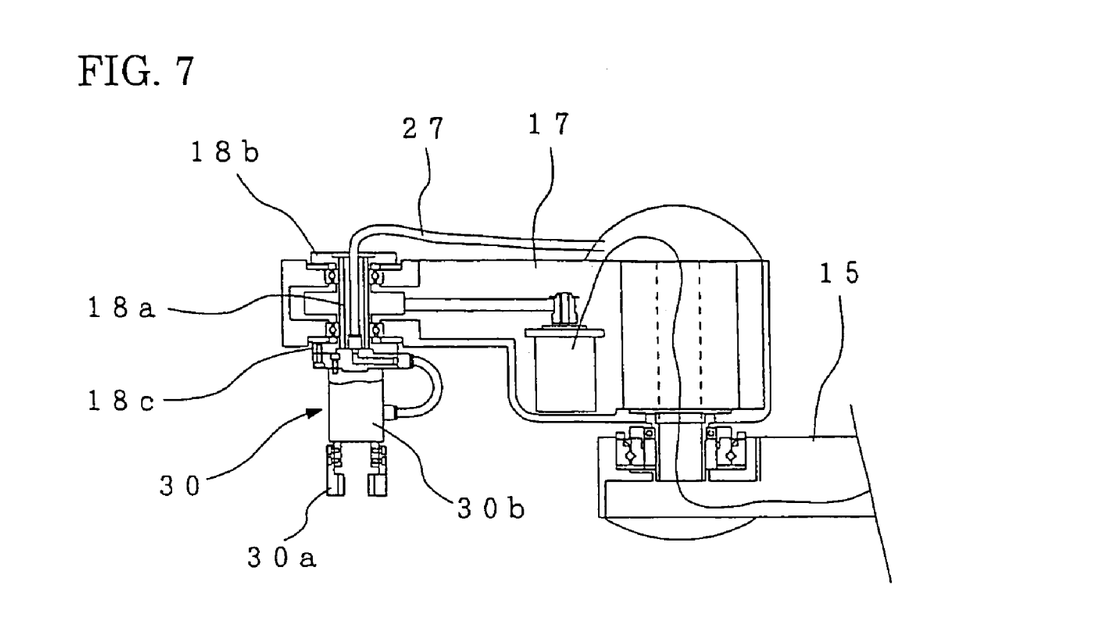
FIG. 7 is a sectional view of a mounting example of another end effector mounted on the lower side of the second arm.

FIG. 7 shows an example of another end effector mounted on the lower side of the second arm 17, wherein the end effector is composed of a gripper 30 for opening and closing gripper claws 30*b* by an air cylinder 30*a* and the like. The gripper 30 is attached to the lower hollow mounting flange 18*c* of the hollow rotary shaft 18*a*.

Assembly, transport, and the like of the parts can be executed also by the gripper 30.

Embodiment 2

Figure 8:
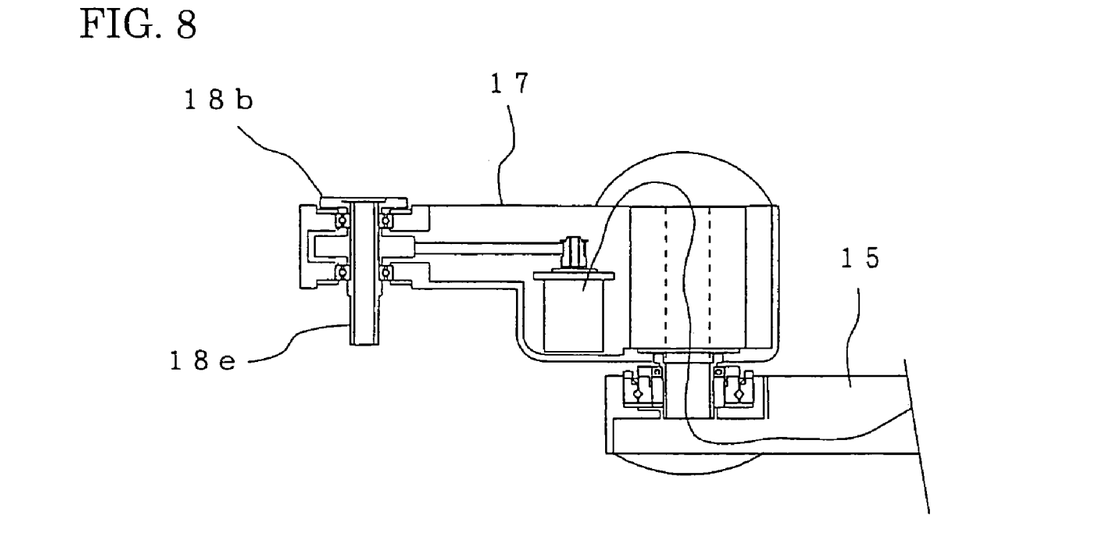
FIG. 8 is a sectional view of a second arm portion of an embodiment 2 of the present invention.

FIG. 8 is a sectional view of the portion of a second arm 17 in a horizontal articulated robot of an embodiment 2 according to the present invention.

Although the embodiment 1 described above shows the hollow mounting flanges 18*b*, 18*c* disposed to both the upper and lower ends of the hollow rotary shaft 18*a*, the embodiment 2 shows a hollow rotary shaft 18*e* having a hollow mounting flange disposed on one side, for example, an upper hollow mounting flange 18*b*. Further, the lower portion of the hollow rotary shaft 18*e* extends somewhat long toward the lower side of the second arm 17. A required assembly job can be executed by mounting a not shown tool (for example, screwdriver, welding torch, and the like) on the projecting portion extending downward.

Embodiment 3

Figure 9A:
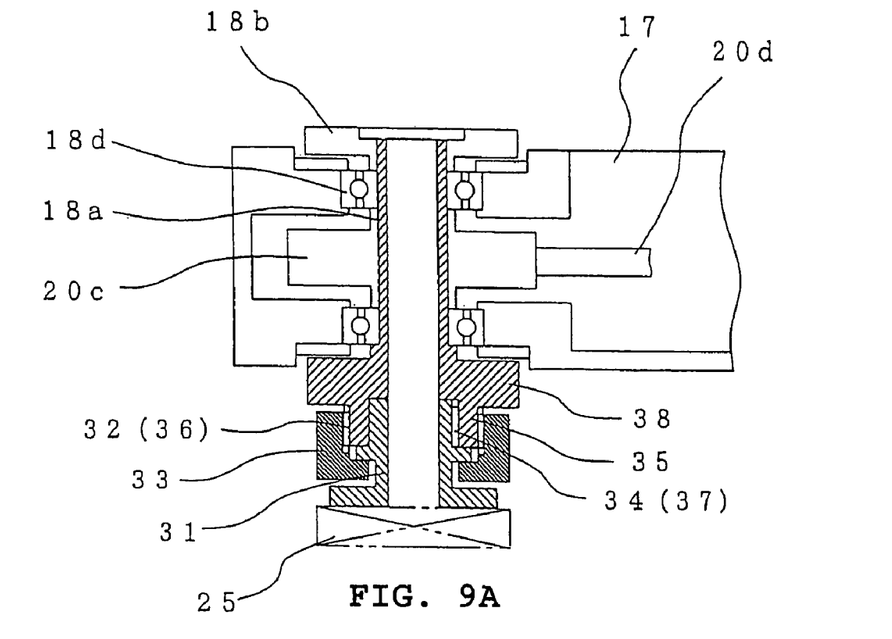
FIGS. 9A-9C are configurational views of a coupling means for coupling a hollow rotary shaft with an end effector which shows an embodiment 3 of the present invention, wherein 9A is a sectional view of a coupling state, 9B is a lower surface view on a hollow rotary shaft side, and 9C is an upper surface view on an end effector side.
Figure 9B:
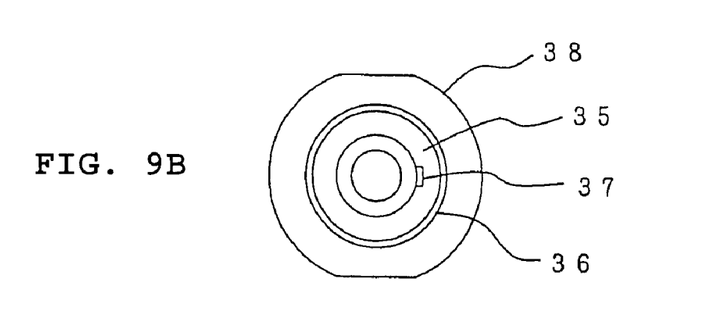
Figure 9C:
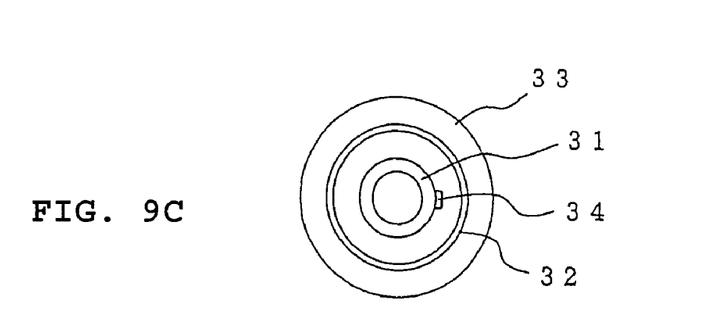

FIGS. 9A-9C are configurational views of a coupling means which couples a hollow rotary shaft 18*a* with an end effector 25 and shows an embodiment 3 according to the present invention, wherein 9A is a sectional view of a coupling state, 9B is a lower surface view on a hollow rotary shaft side, and 9C is an upper surface view on a coupling means side.

Although the hollow rotary shaft 18a is coupled with the end effector by the flange coupling in the embodiments 1 and 2 described above, the embodiment 3 is arranged such that they can be coupled with each other by screw coupling in an instant mounting/dismounting system.

More specifically, a coupling 33, which has a female screw 32 cut thereto, is disposed to a hollow cylinder 31 having an end effector 25 previously mounted on the lower end thereof. Further, the hollow cylinder 31 has a positioning key 34 disposed thereto. A coupling means on the end effector 25 side is arranged by the arrangement described above.

On the other hand, as to the hollow rotary shaft 18a side, a coupling portion 35 with which the hollow cylinder 31 is engaged is disposed to the lower portion of the hollow rotary shaft 18a, and a male screw 36, which is coupled with the female screw 32 of the coupling 33, is formed to the coupling portion 35. Further, a key groove 37 into which the positioning key 34 is inserted is formed to the coupling portion 35. Reference numeral 38 denotes a presser flange portion of a lower bearing 18d. A corresponding coupling means on the hollow rotary shaft 18a side is arranged by the arrangement described above.

The presser flange portion 38 is pressed with a hand or a tool to prevent the rotation of the hollow rotary shaft 18a because it is rotated when left as it is. The hollow cylinder 31 on which the end effector 25 is previously mounted is positioned to and engaged with coupling portion 35, and then the coupling 33 is screwed into the coupling portion 35, thereby the end effector 25 can be simply coupled with the hollow rotary shaft 18a in a short time. Further, although illustration is omitted, the airtightness of the coupling portion can be kept by attaching a seal member such as an O-ring and the like to the coupling portion when necessary.

Embodiment 4

Figure 10:
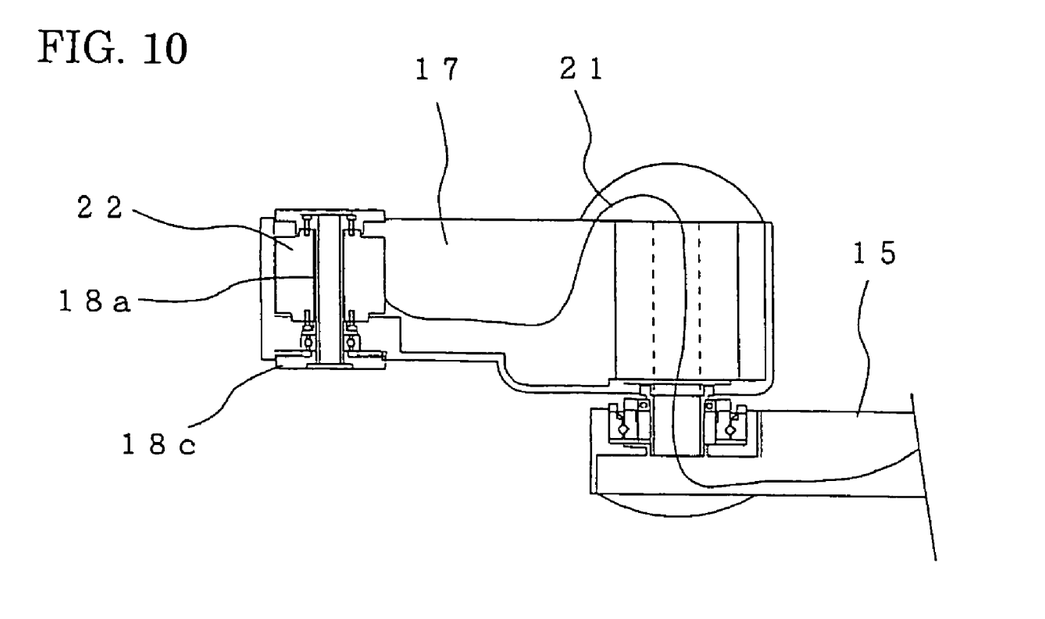
FIG. 10 is a sectional view of a second arm portion showing an embodiment 4 of the present invention.

FIG. 10 is a sectional view of the portion of a second arm 17 showing an embodiment 4 according to the present invention.

The embodiments 1 to 3 described up to now employ the belt drive mechanism 20 as a drive means of the hollow rotary shaft 18a. In the embodiment 4, however, a pulley portion is composed of a direct drive hollow motor 22 as shown in FIG. 10. More specifically, in this arrangement, the hollow rotary shaft 18a constitutes a motor shaft of the hollow motor 22. Accordingly, a drive means of the hollow rotary shaft 18a can be arranged compact.

What is claimed is:

1. A horizontal articulated robot comprising:
a plurality of horizontal arms coupled by a joint shaft, the plurality of horizontal arms including an extreme end arm;
a hollow rotary working shaft disposed at an extreme end of the extreme end arm;
two hollow mounting portions each for mounting an end effector to the robot, the two hollow mounting portions including:
a hollow upper mounting portion disposed at an upper end of the hollow rotary working shaft; and
a hollow lower mounting portion disposed at a lower end of the hollow rotary working shaft;
an end effector being alternately mounted to either one of the upper mounting portion or the lower mounting portion of the working shaft, the end effector being adapted to support one of a work and a tool for processing the work; and
two bearings disposed in a vicinity of each of the two hollow mounting portions for rotatably supporting upper and lower portions of the working shaft.

2. A horizontal articulated robot according to claim 1, wherein one of the hollow mounting portions further comprises a hollow mounting flange disposed to at least one end of the hollow rotary working shaft.

3. A horizontal articulated robot according to claim 1, wherein wiring for the end effector passes through the inside of the hollow rotary working shaft.

4. A horizontal articulated robot according to claim 1, wherein piping for the end effector passes through the inside of the hollow rotary working shaft or is airtightly connected to one of the two hollow mounting portions opposite to a hollow mounting portion of the end effector.

5. A horizontal articulated robot according to claim 1, wherein the hollow mounting portions further comprise hollow mounting flanges or instant mounting/dismounting couplers.

6. A horizontal articulated robot according to claim 1, wherein a driver of the hollow rotary working shaft is disposed inside of the extreme end arm.

7. A horizontal articulated robot according to claim 1, wherein all of the plurality of horizontal arms are hollow.

8. A horizontal articulated robot according to claim 7, further comprising a hollow arm base coupled with an up/down movement mechanism to support the plurality of horizontal arms.

9. A horizontal articulated robot according to claim 7, wherein wiring and/or piping for the end effector passes through the inside of the extreme end arm.

10. A horizontal articulated robot according to claim 2, wherein wiring for the end effector passes the inside of the hollow rotary working shaft.

11. A horizontal articulated robot according to claim 2, wherein piping for the end effector passes through the inside of the hollow rotary working shaft or is airtightly connected to one of the mounting portions opposite a mounting portion of the end effector.

12. A horizontal articulated robot according to claim 8, wherein wiring and/or piping for the end effector passes through the inside of the extreme end arm.

* * * * *